(12) United States Patent
Honda et al.

(10) Patent No.: US 8,434,784 B2
(45) Date of Patent: May 7, 2013

(54) AIRBAG APPARATUS

(75) Inventors: Kensaku Honda, Kiyosu (JP); Yasushi Okada, Kiyosu (JP); Yuji Sato, Kiyuso (JP); Masakazu Hashimoto, Kiyosu (JP); Daisuke Yamamura, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 111 days.

(21) Appl. No.: 12/923,467

(22) Filed: Sep. 23, 2010

(65) Prior Publication Data

US 2011/0074136 A1 Mar. 31, 2011

(30) Foreign Application Priority Data

Sep. 30, 2009 (JP) ................................. 2009-227305

(51) Int. Cl.
*B60R 21/235* (2006.01)
*B60R 21/231* (2011.01)

(52) U.S. Cl.
USPC ..................................... 280/743.1; 280/728.1

(58) Field of Classification Search ............... 280/728.1, 280/730.1, 730.2, 743.1, 743.2
See application file for complete search history.

(56) References Cited

U.S. PATENT DOCUMENTS

| | | | | |
|---|---|---|---|---|
| 5,114,180 A * | 5/1992 | Kami et al. | ................ | 280/743.1 |
| 5,240,283 A * | 8/1993 | Kishi et al. | .................... | 280/729 |
| 5,452,914 A * | 9/1995 | Hirai | ........................ | 280/743.1 |
| 5,456,493 A * | 10/1995 | Bauer et al. | ................. | 280/743.1 |
| 5,505,485 A * | 4/1996 | Breed | ............................ | 280/729 |
| 5,524,926 A * | 6/1996 | Hirai et al. | ................. | 280/743.1 |
| 5,615,914 A * | 4/1997 | Galbraith et al. | .......... | 280/743.1 |
| 5,653,464 A * | 8/1997 | Breed et al. | ................ | 280/743.1 |
| 5,676,395 A * | 10/1997 | Oe et al. | ..................... | 280/730.2 |
| 5,765,863 A * | 6/1998 | Storey et al. | .................. | 280/729 |
| 5,863,068 A * | 1/1999 | Breed | ........................ | 280/743.1 |
| 5,997,034 A * | 12/1999 | Hirai et al. | ................. | 280/743.1 |
| 6,149,194 A * | 11/2000 | Breed et al. | ................ | 280/743.1 |
| 6,170,871 B1 * | 1/2001 | Goestenkors et al. | ...... | 280/743.1 |
| 6,179,322 B1 * | 1/2001 | Faigle et al. | ................ | 280/728.2 |
| 6,344,251 B1 * | 2/2002 | Keshavaraj et al. | .......... | 428/35.2 |

(Continued)

FOREIGN PATENT DOCUMENTS

| | | |
|---|---|---|
| JP | U-1-125753 | 8/1989 |
| JP | A-H07-291069 | 11/1995 |

(Continued)

OTHER PUBLICATIONS

Machine translation of WO0071390A1 [online]. [Retrieved on Mar. 24, 2012] Retrieved from Espacenet search of the European Patent Office using Internet<URL:http://translationportal.epo.org/emtp/translate/?ACTION=description-retrieval&COUNTRY=WO&FORMAT=docdb&KIND=A1&LOCALE=en_EP&NUMBER=0071390&OPS=ops.epo.org&ENGINE=google&SRCLANG=de&TRGLANG=en>.*
Office Action mailed Dec. 18, 2012 in corresponding JP Application No. 2009-227305 (and English translation).

*Primary Examiner* — Paul N Dickson
*Assistant Examiner* — Barry Gooden, Jr.
(74) *Attorney, Agent, or Firm* — Posz Law Group, PLC

(57) ABSTRACT

An airbag apparatus is mounted on a vehicle as housed in a housing and includes an airbag inflatable with inflation gas for catching an object of protection. The airbag includes a sheet-shaped circumferential wall made from synthetic resin. The circumferential wall is plastically deformable in such a manner as to be elongated due to increase of internal pressure caused by being pressed by the object of protection when arresting the object of protection at full inflation.

18 Claims, 17 Drawing Sheets

U.S. PATENT DOCUMENTS

| | | | |
|---|---|---|---|
| 7,360,791 B2* | 4/2008 | Yamada | 280/743.2 |
| 7,641,224 B2* | 1/2010 | Riedel et al. | 280/729 |
| 7,820,566 B2* | 10/2010 | Breed et al. | 442/186 |
| 2005/0173899 A1* | 8/2005 | Korechika | 280/730.1 |
| 2007/0013174 A1* | 1/2007 | Riedel et al. | 280/730.2 |
| 2011/0042929 A1* | 2/2011 | Breed et al. | 280/743.1 |
| 2011/0133435 A1* | 6/2011 | Sadr et al. | 280/730.1 |
| 2011/0260432 A1* | 10/2011 | Matsushima | 280/730.2 |

FOREIGN PATENT DOCUMENTS

| | | |
|---|---|---|
| JP | A-09-024787 | 1/1997 |
| JP | A-H10-1009 | 1/1998 |
| JP | A-10-264187 | 10/1998 |
| JP | A-2004-276808 | 10/2004 |
| WO | WO 0071390 A1 * | 11/2000 |

* cited by examiner

AIRBAG APPARATUS

The Present application claims priority from Japanese Patent Application No. 2009-227305 of Honda et al., filed on Sep. 30, 2009, the disclosure of which is hereby incorporated into the present application by reference.

BACKGROUND OF THE INVENTION

1. Field of the Invention

The present invention relates to an airbag apparatus including an airbag which is housed in a housing and inflatable with inflation gas for arresting an object of protection.

2. Description of Related Art

An airbag for an airbag apparatus is known whose circumferential wall is comprised of woven fabric of polyamide yarn, polyester yarn or the like. Such an airbag as is comprised of woven fabric allows permeation of inflation gas from interior to exterior after completion of airbag inflation. To cope with this issue, JP 9-24787 A and JP10-264187 A are illustrative of an airbag whose circumferential wall is formed of a film of synthetic resin so as to maintain air tightness after completion of inflation.

The airbag disclosed in the above references includes a vent hole on the circumferential wall for releasing gas alike the fabric airbag in order to secure protecting performance.

SUMMARY OF THE INVENTION

An object of the present invention is to provide an airbag apparatus including an airbag having an excellent protecting property and capable of protecting an object of protection securely.

The airbag apparatus is adapted to be mounted on a vehicle as housed in a housing and includes an airbag inflatable with inflation gas for catching an object of protection. The airbag includes a sheet-shaped circumferential wall made from synthetic resin. The circumferential wall is designed plastically deformable in such a manner as to be elongated due to increase of internal pressure caused by being pressed by the object of protection when arresting the object of protection after full inflation.

With this configuration, the circumferential wall of the airbag is plastically deformed in such a manner as to be elongated when the object of protection presses the circumferential wall after full airbag inflation. This will not only enable the airbag to absorb the kinetic energy of the object of protection by plastic deformation of the circumferential wall but also conduce to increase the volume of the airbag according to elongation of the circumferential wall, thereby suppressing the internal pressure of the airbag without emitting inflation gas. Accordingly, the airbag reduces the kinetic energy of the object of protection and restrains the object of protection without applying so much reaction force to the object of protection upon receiving the object of protection, thus protecting the object of protection softly.

Therefore, the airbag apparatus of the invention is excellent in protecting performance and capable of protecting the object of protection securely.

Moreover, since the circumferential wall of the airbag is fabricated of synthetic resin, gas leakage from the circumferential wall after full inflation of the airbag will be prevented, thereby improving air tightness of the airbag and enabling the airbag to have good internal pressure maintaining characteristics. Furthermore, this configuration will allow the airbag to employ an inflator of small output for feeding inflation gas to the airbag, and thereby reducing the cost for manufacturing of the airbag apparatus in comparison to an instance where the airbag is formed of woven fabric.

If the airbag is further designed to complete inflation at or under a tensile stress at yield point of the synthetic resin forming the circumferential wall of the airbag, the output of the inflator will not have to be increased unduly.

In the airbag apparatus of the invention, the airbag is so configured that the circumferential wall is plastically deformed in such a manner as to be elongated when being pressed by an object of protection. At this time, the airbag increases its volume according to the elongation of the circumferential wall, such that the internal pressure of the airbag is suppressed without exhausting inflation gas. That is, the airbag is capable of protecting the object of protection appropriately even without such a vent mechanism as a vent hole for exhausting gas. Therefore, the airbag can employ an inflator of even smaller output.

The airbag apparatus may include means for regulating elongating direction of the circumferential wall at plastic deformation. Such means will help control the shape of the airbag upon catching an object of protection adequately, thereby enabling the airbag to arrest the object of protection securely.

The means for regulating elongating direction may be comprised of a covering portion that covers at least part of an outer circumference of the airbag on a direction to be regulated. Such covering portion will allow the circumferential wall of the airbag to be elongated toward a predetermined direction while preventing elongation toward other directions. The means for regulating elongating direction may also be comprised of differentiating thicknesses of the circumferential wall from part to part.

The airbag apparatus of the invention may also include around the airbag means for regulating the outer contour of the airbag after plastic deformation. Such means will prevent the circumferential wall of the airbag from thinning too much due to progress of plastic deformation, and thus help keep the airbag in an adequate outer contour for catching an object of protection.

DESCRIPTION OF PREFERRED EMBODIMENTS

Preferred embodiments of the present invention are described below with reference to the accompanying drawings. In the preferred embodiments, the invention is described as applied to a side impact airbag apparatus S1/S2 mounted on a seat of a vehicle. However, the invention is not limited to the embodiments disclosed herein. All modifications within the appended claims and equivalents relative thereto are intended to be encompassed in the scope of the claims.

Figure 1:
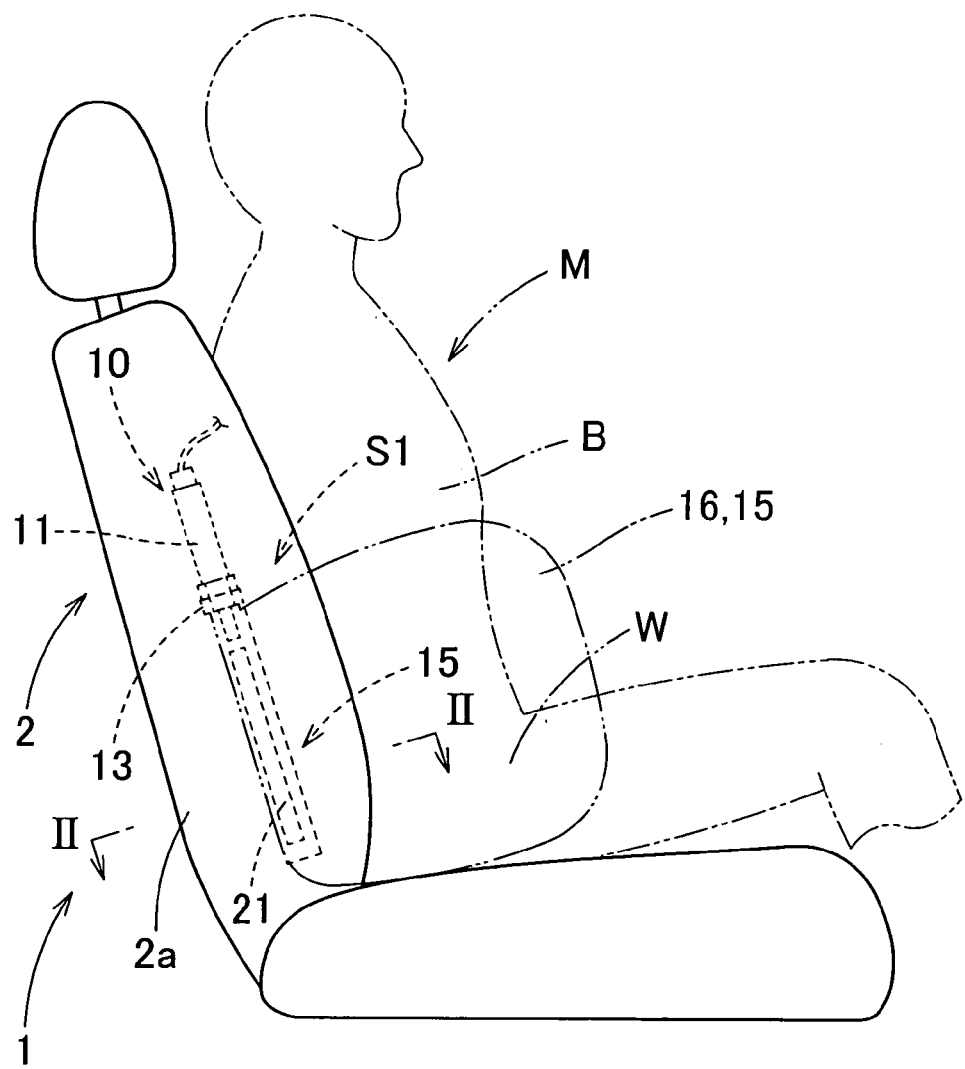
FIG. 1 is a side view of a side impact airbag apparatus according to the first embodiment of the invention as mounted on a seat.
Figure 2:
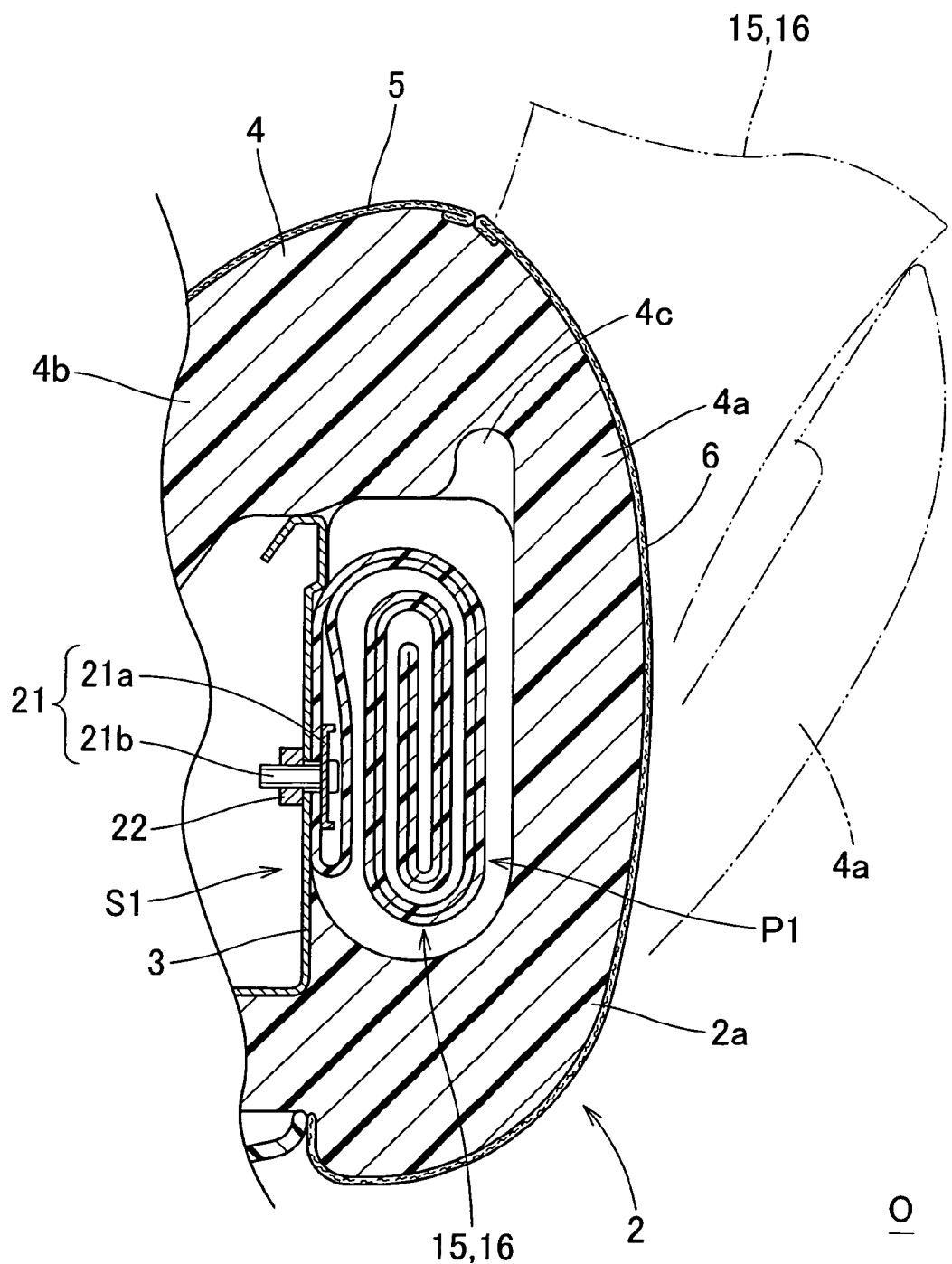
FIG. 2 is a schematic cross section of the airbag apparatus of FIG. 1, taken along line II-II of FIG. 1.

As shown in FIGS. 1 and 2, the side impact airbag apparatus S1, the first embodiment of the present invention, is mounted on an outboard (generally indicated at O) lateral (on a right lateral, in the illustrated embodiment) 2a of a back portion 2 of a seat 1 of a vehicle on which an occupant M or object of protection is to be seated. Unless otherwise specified, up/down, front/rear and left/right directions in the embodiments are intended to refer to up/down, front/rear, and left/right directions of the vehicle.

The seat back portion 2 includes a frame 3 extending generally vertically. The airbag apparatus S1 is secured to the frame 3 by nuts fastening of bolts projecting from a diffuser 11 of a later-described inflator 10 and fastening of the rear end of a later-described airbag 15 with a mounting bracket 21. In FIG. 2, a member indicated at 4 is a cushion, and members indicated at 5 and 6 are surface skins made of decoration fabric or the like. An edge portion 4a located on the right side (i.e., on the outboard side O) of the cushion 4 covers the airbag apparatus S1 on the front and outboard side O. Upon deployment of the airbag 15, the edge portion 4a is pushed by the airbag 15 and separated from a center part 4b of the cushion 4. The cushion 4 includes a recessed area 4c that helps separate the edge portion 4a from the center part 4b thereat constantly. In this specific embodiment, a void area provided between the cushion 4 and frame 3 forms a housing area P1 (FIG. 2) that houses the folded-up airbag 15 and inflator 10.

The airbag apparatus S1 includes an airbag 15 and an inflator 10 for supplying the airbag 15 with inflation gas.

Figure 3:
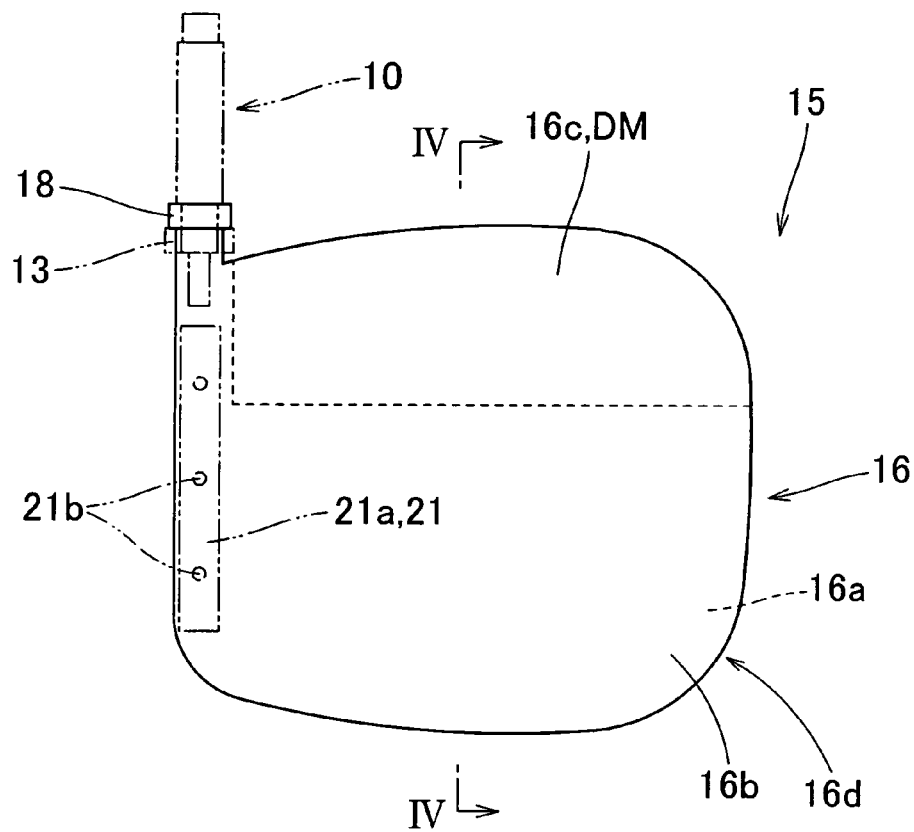
FIG. 3 is a side view of an airbag of the airbag apparatus of the first embodiment.

As shown in FIGS. 1 to 3, the inflator 10 is generally columnar in outer contour for mounting to extend generally along the frame 3 of the seat 1. The inflator 10 includes at the lower area in the mounted state gas discharge ports (not shown), and is coupled to a later-described joint port 18 of the airbag 15 by the vicinity of the gas discharge ports, with a clamp 13. A diffuser 11, which is made of sheet metal, is mounted around and holds the inflator 10. The inflator 10 is mounted on the frame 3 of seat 1 by nut fastening of unillustrated bolts of the diffuser 11 to the frame 3.

As shown in FIG. 3, the airbag 15 includes an inflatable body 16 inflatable with inflation gas and a joint port 18 which is generally tubular in shape and extends upward from the rear upper end of the inflatable body 16. The joint port 18 is open upward for receiving the inflator 10. A mounting bracket 21 is housed inside and proximate the rear end of the inflatable body 16. The mounting bracket 21 includes a main body 21a elongated in a vertical direction and a plurality of bolts 21b projecting from the main body 21, which bolts 21b are put through the inflatable body 16 to the outside and nut 22 fastened 22 to the frame 3, thereby mounting the airbag 15 to the frame 3. The inflatable body 16 includes an inboard side wall 16a deployable on the inboard side and an outboard side wall 16b deployable on the outboard side, and is so sized as to be capable of arresting the pelvis section W of an occupant M seated in the seat 1 at full inflation, in this specific embodiment.

The airbag 15 is fabricated of synthetic resin. In this embodiment, the airbag 15 is shaped by blow molding into a one-piece bag having the shape at full inflation, i.e., such a shape that the inboard side wall 16a and outboard side wall 16b are separated by the thickness at full inflation. The airbag 15 is folded up, in such a manner as to remove air from the joint port 18, by making the walls 16a and 16b contact each other and folding up the walls 16a and 16b together, and is housed in the housing area P1, surrounded by the cushion 4 and frame 3. As shown in FIG. 2, the inflatable body 16 of this specific embodiment is housed in the housing area P1 while being rolled from the front end at full inflation to the rear end. When the inflator 10 is activated, the airbag 15 is fed with inflation gas and unrolls and unfolds while projecting from the housing area P1. Eventually the airbag 15 completes inflation with the inboard side wall 16a and outboard side wall 16b separated from each other, in such a manner as to be restored to the outer contour as molded.

Figure 4:
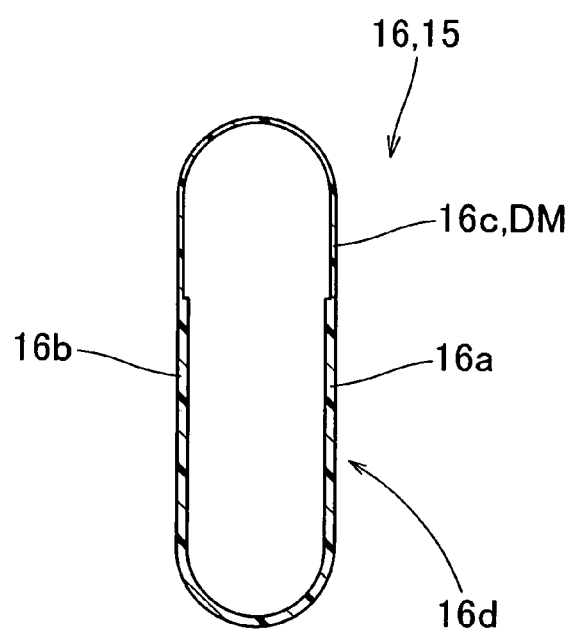
FIG. 4 is a sectional view taken along line IV-IV of FIG. 3.
Figure 6:
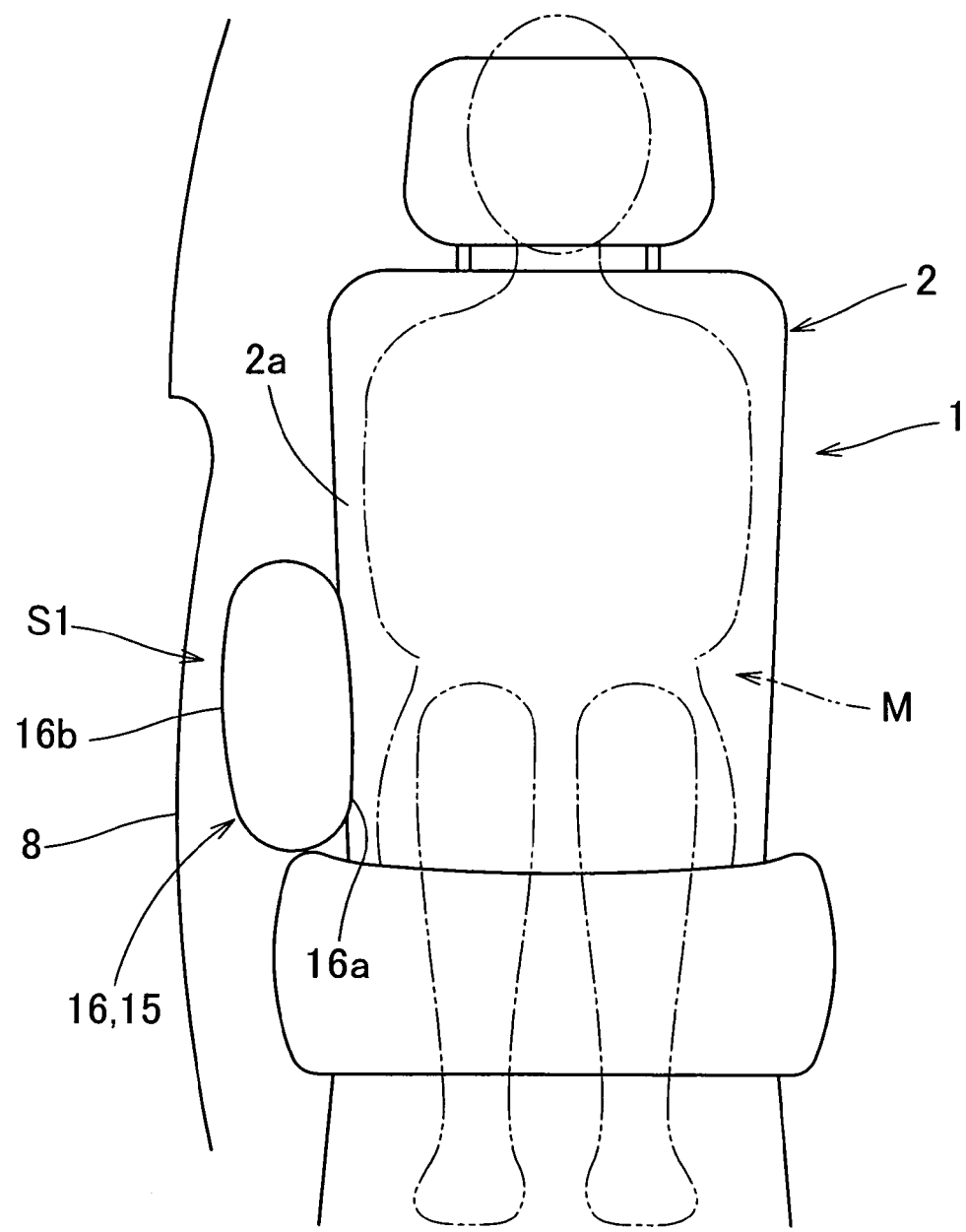
FIG. 6 is a front view of the airbag apparatus of the first embodiment showing the airbag fully inflated.
Figure 7:
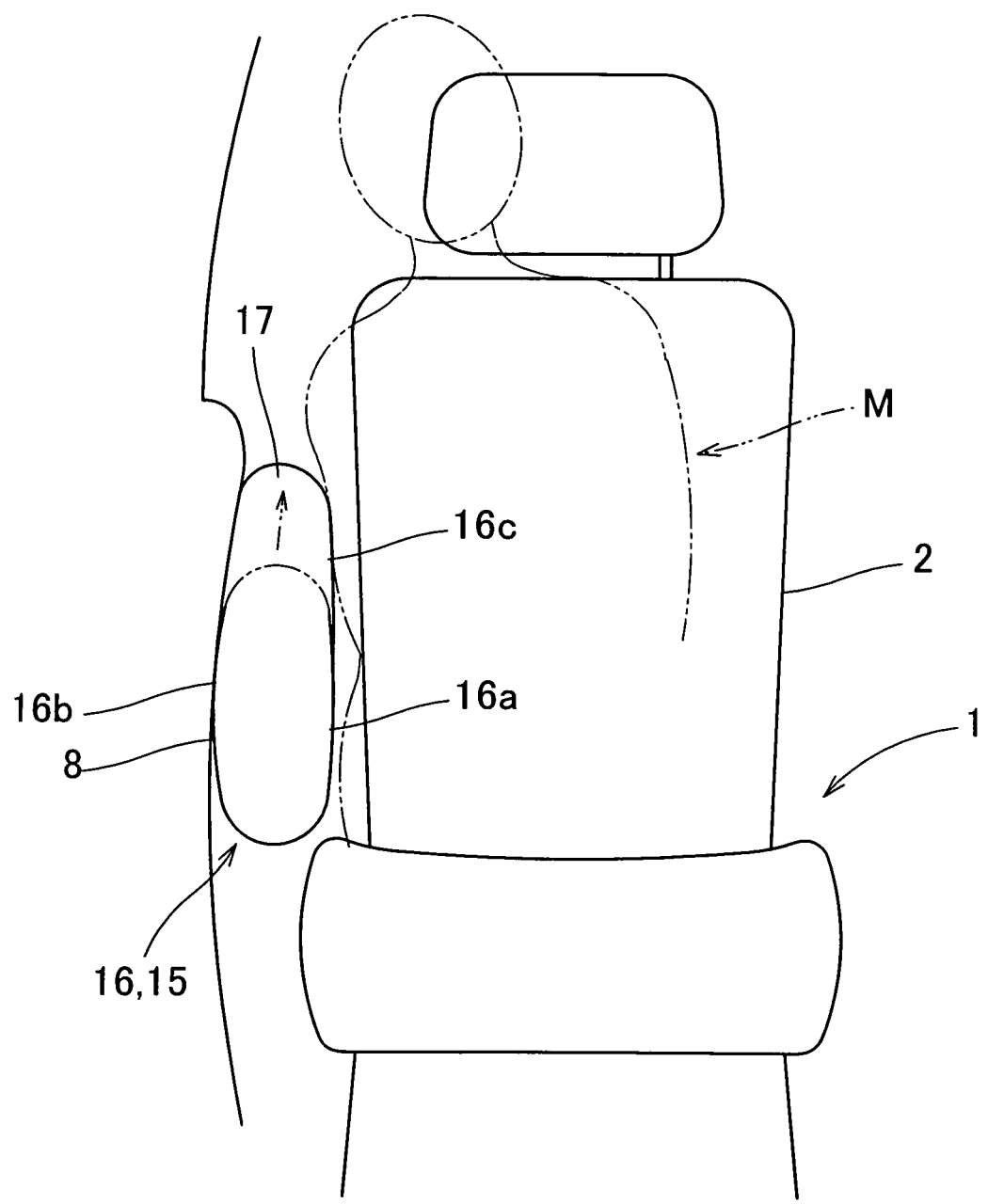
FIG. 7 is a front view of the airbag apparatus of the first embodiment showing the airbag subjected to plastic deformation after full inflation.

The airbag 15 of the embodiment is so plastically deformable that the circumferential wall of the inflatable body 16, i.e., the inboard side wall 16a and outboard side wall 16b, are elongated or stretched when the airbag 15 arrests an occupant M by the area of the inflatable body 16 after full inflation. Specifically, when the inflatable body 16 arrests an occupant M, a partial pressing by the occupant M and/or increase of internal pressure of the inflatable body 16 due to decrease of volume on account of arresting the occupant M cause tensile stress on the inboard side wall 16a and outboard side wall 16b, so that the walls 16a and 16b are elongated or plastically deformed. In this embodiment, as shown in FIGS. 3 and 4, an upper area 16c of each of the inboard side wall 16a and outboard side wall 16b, which is deployable at upper side at full airbag inflation, is thin in thickness than the remaining area, i.e. a lower area 16d. With this configuration, when the inflatable body 16 of the fully inflated airbag 15 is supported by a vehicle body structure or a door trim 8 (FIG. 6) disposed generally vertically and catches an occupant M, a tensile force (tensile stress) acts on the inboard side wall 16a and outboard side wall 16b in a uniform fashion, so that the upper area 16c thinner than the remaining area 16d is elongated and therefore, the inboard side wall 16a and outboard side wall 16b are plastically deformed upward in a elongating fashion (FIG. 7). That is, in the airbag 15, the thin area 16c formed on the upper section of each of the inboard side wall 16a and outboard side wall 16b constitutes means DM for regulating elongating direction that regulates the elongating direction of the inboard side wall 16a and outboard side wall 16b at plastic deformation. An enlarged area 17, which is formed by upward elongation or plastic deformation of the thin area 16c, protects the thorax section B of an occupant M, as indicated by double-dashed lines in FIG. 5.

Figure 9:
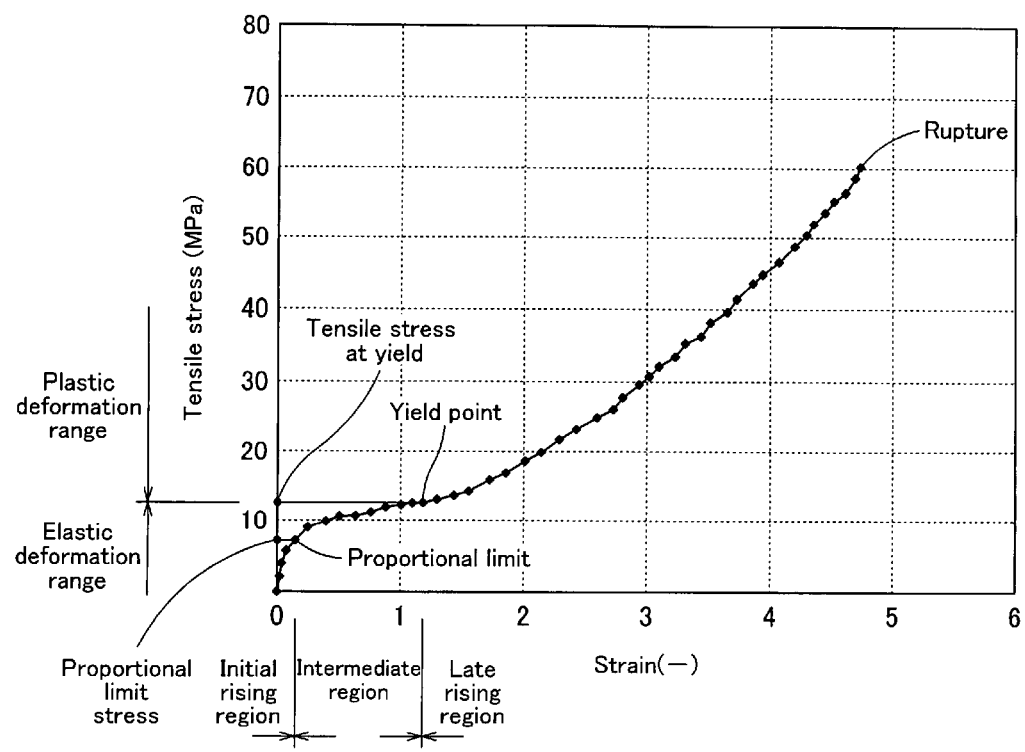
FIG. 9 is a graph showing a tensile stress-strain curve of the synthetic resin forming the airbag of the first embodiment.

The airbag 15 of the embodiment is configured easy to fold up with not so much fear of unfolding (rebounding), and configured to deform plastically in such a manner that the inboard side wall 16a and outboard side wall 16b are elongated when it catches an occupant M by the inflatable body 16 after full inflation with the outer face (i.e., the outboard side wall 16b) supported by the door trim 8. In this embodiment, the internal pressure of the airbag 15 at full inflation is set at 50 kPa. It is presumed that the plastic deformation upon catching an occupant M is accelerated when, due to increase of internal pressure of the inflatable body 16 and pressure given by the occupant M, a tensile force (tensile stress) occurring on the inboard side wall 16a and outboard side wall 16b surpasses the tensile stress at yield point which bounds an elastic deformation range and a plastic deformation range of the synthetic resin of which the airbag 15 is fabricated. That is, the airbag 15 is so constructed as to complete inflation at or under the tensile stress at yield. To this end, the airbag 15 is required to be fabricated of such type of synthetic resin as shows a yield point in a tensile stress-strain curve. Tensile stress at yield point here is synonymous with tensile strength at yield. It is a tensile stress at a point where increase in elongation is shown without increase in load on a tensile stress-strain curve (load-elongation curve) as referred to in JIS K 7113. Specifically, as described later, a tensile stress-strain curve of FIG. 9 firstly shows a steep rise (initial rising region), then a suppressed rise (middle region) and again turns to rise at a larger angle (late rising region). The turn from the middle region to late rising region indicates a yield point. It is desired that the airbag 15 of the embodiment is fabricated of such type of synthetic resin that a tensile stress at rupture is greater than that at yield point in the tensile stress-strain curve so as to further inflate after entering the plastic deformation range. It is further desired that the airbag 15 completes inflation at or under the tensile stress at proportional limit. Once surpassing the tensile stress at proportional limit, the tensile force (tensile stress) occurring on the inboard side wall 16a and outboard side wall 16b will presumedly increase rapidly to surpass the tensile stress at yield, thereby deforming or elongating the inboard side wall 16a and outboard side wall 16b.

To achieve the operation described above, the airbag 15 of the embodiment is fabricated of a synthetic resin which exhibits a tensile strength of about 60 MPa (desirably, 40 to 60 MPa) according to JIS K 7311, a tensile stress at proportional limit of 0.5 MPa and above (desirably, within a range of 3 to 50 MPa) according to JIS K 7113, a tensile stress at yield of 1 MPa and above (desirably, within a range of 5 to 80 MPa) according to JIS K 7113, and a breaking elongation of 450% and above (desirably 500% and above) according to JIS K 7161. Specifically, thermoplastic urethane elastomers (TPU), thermoplastic olefin elastomers (TPO), thermoplastic chlorinated polyethylene elastomers (TCM) or the like can be used for such synthetic resin for the airbag 15. Each of the inboard side wall 16a and outboard side wall 16b constituting the circumferential wall of the airbag 15 is configured to have a thickness of 0.1 to 1.0 mm (desirably 0.3 to 0.8 mm). It is desired that the difference in thickness between the upper (thin) area 16c and lower area 16d is 0.3 to 0.5 mm.

The airbag 15 of this specific embodiment is fabricated of a thermoplastic urethane elastomer (TPU) which exhibits a tensile strength of 50 MPa according to JIS K 7311. As shown in a graph of FIG. 9, measured at ambient temperature according to JIS K 7113, the elastomer exhibits a tensile stress at proportional limit of 6 MPa, a tensile stress at yield of 13 MPa, and a tensile stress at rupture of 60 MPa. The airbag 15 has a volume of 8 liter and is set in internal pressure at full inflation at 50 kPa. The circumferential wall of the inflatable body 16, i.e. the inboard side wall 16a and outboard side wall 16b, is configured such that the upper thin area 16c is 0.3 mm in thickness whereas the lower area 16d is 0.5 mm.

Figure 5:
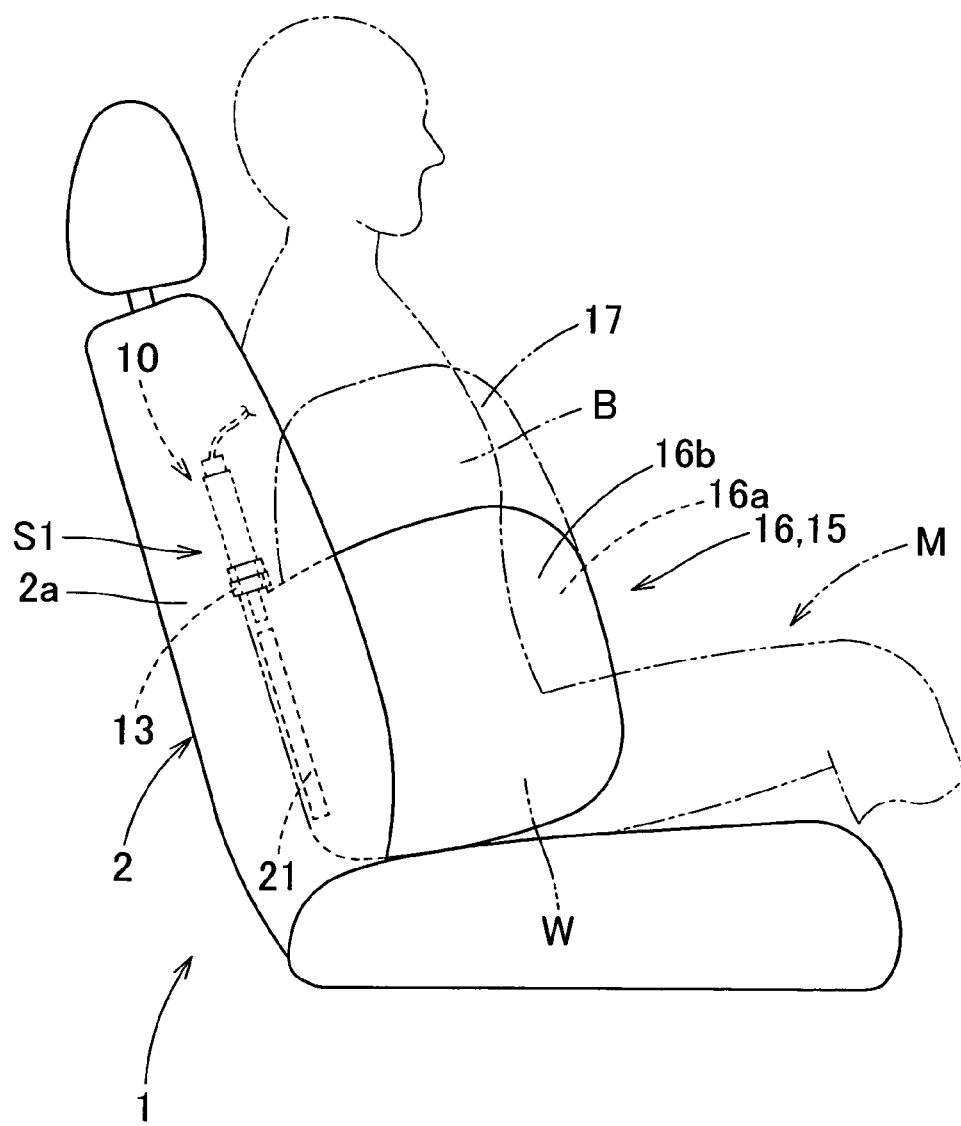
FIG. 5 is a side view of the airbag apparatus of the first embodiment showing the airbag fully inflated.

In operation, when the inflator 10 is activated after the airbag apparatus S1 is mounted on board, an inflation gas is fed from unillustrated gas discharge ports of the inflator 10 into the airbag 15. The airbag 15 inflates with the gas and pushes and separates the edge portion 4a of the cushion 4 from the center part 4b so it opens up, and deploys forward between the door trim 8 and an occupant M as shown in FIGS. 5 and 6. Then the airbag 15 completes inflation in such a manner as to be restored to outer contour as molded, with the inboard side wall 16a and outboard side wall 16b separated.

In the airbag apparatus S1 of the embodiment, when an object of protection (i.e., an occupant M) presses the circumferential wall of the airbag 15, i.e., the inboard side wall 16a and outboard side wall 16b, after full inflation of the airbag 15, the walls 16a and 16b are plastically deformed in such a manner as to be elongated.

Figure 8A:
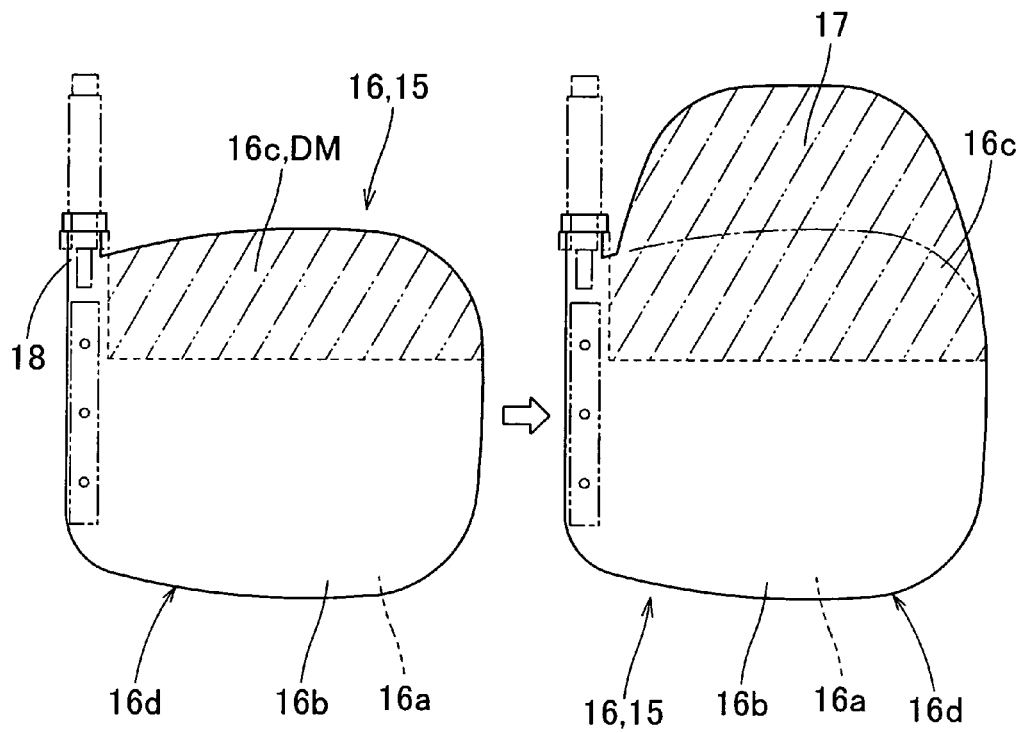
FIG. 8A shows side views of the airbags in the first embodiment at full inflation and after plastic deformation.
Figure 8B:
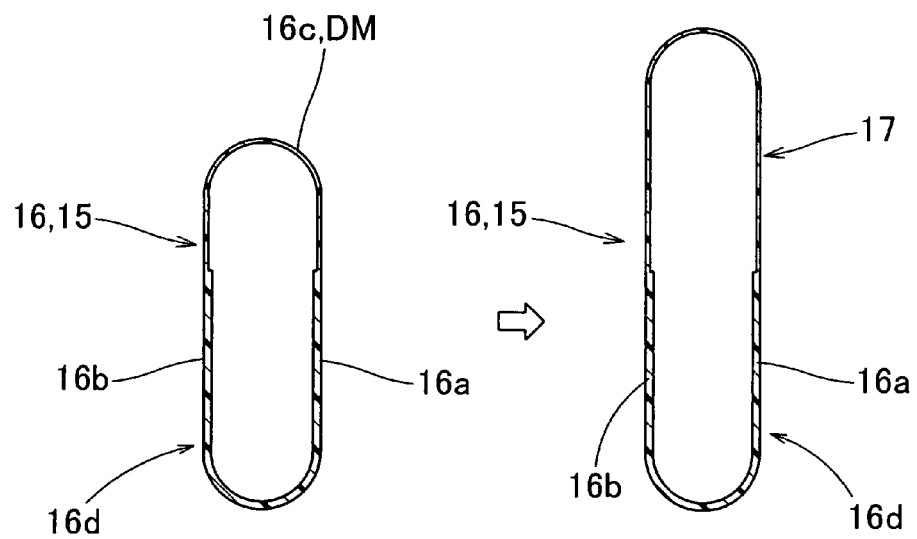
FIG. 8B shows sectional views of the airbags in the first embodiment at full inflation and after plastic deformation.

More specifically, the airbag apparatus S1 is adapted to be mounted on the back portion 2 of the seat 1 on which an occupant M (object of protection) is to be seated, and is designed to deploy the airbag 15 between the occupant M and the door trim 8 as a vehicle body structure located on the outboard side of the seat 1 to cover an outboard lateral of the occupant M, as shown in FIG. 6. The airbag 15 (inflatable body 16) is designed, when the occupant M presses the inflatable body 16 of the fully inflated airbag 15 and is arrested by the inflatable body 16 as shown in FIG. 7, to deform plastically with the outer face (i.e., the outboard side wall 16b) supported by the door trim 8 in such a manner that the inboard side wall 16a and outboard side wall 16b are elongated and an area for covering and protecting the lateral of the occupant M is enlarged as shown in FIGS. 8A and 8B. This configuration not only enables the airbag 15 to absorb the kinetic energy of the occupant M by plastic deformation of the inboard side wall 16a and outboard side wall 16b, but also conduces to increase the volume of the airbag 15 according to elongation of the inboard side wall 16a and outboard side wall 16b (according to the enlarged area 17), thereby suppressing the internal pressure of the airbag 15 from increasing without emitting inflation gas. Accordingly, the airbag 15 reduces the kinetic energy of the occupant M and restrains the occupant M without applying so much reaction force to the occupant M upon receiving the occupant M, thereby protecting the occupant M softly.

Therefore, the airbag apparatus S1 is excellent in protecting performance and capable of protecting the occupant M (object of protection) securely.

The circumferential wall (i.e., the inboard side wall 16a and outboard side wall 16b) of the airbag 15 is fabricated of synthetic resin. This configuration will prevent the walls 16a and 16b from leaking inflation gas after full inflation of the airbag 15, thereby improving air tightness of the airbag 15 and having the airbag 15 to have good internal pressure maintaining characteristics. Moreover, this configuration will allow the airbag 15 to employ an inflator of small output and thereby reducing the cost for manufacturing of the airbag apparatus in comparison to an instance where the airbag is formed of woven fabric.

The airbag 15 is configured to complete inflation at or under the tensile stress at yield point of the synthetic resin that forms the circumferential wall (the inboard side wall 16a and outboard side wall 16*b*) of the airbag 15. This configuration will enable the airbag 15 to inflate without having to increase the output of the inflator unduly. Without considering this advantage, the airbag may also be configured to complete inflation in a plastic deformation range beyond the tensile stress at yield, on condition that the airbag 15 is plastically deformed when arresting an occupant. However, in order to absorb the kinetic energy of the occupant M, it is desired that the airbag completes inflation in an elastic deformation range, i.e., at or under the tensile stress at yield. It is further preferred that the airbag completes inflation at or under the tensile stress at proportional limit, which is smaller than the yield point.

As described above, in the airbag apparatus S1, the airbag 15 is so configured that the inboard side wall 16*a* and outboard side wall 16*b* are plastically deformed in such a manner as to be elongated when the occupant M presses the circumferential wall of the airbag 15. At this time, the airbag 15 increases its volume according to the elongation of the inboard side wall 16*a* and outboard side wall 16*b*, such that the internal pressure of the airbag 15 is suppressed without exhausting inflation gas. That is, the airbag 15 is capable of protecting the occupant M appropriately even without such a vent mechanism that a conventional side impact airbag comprised of woven fabric would have for exhausting gas. Therefore, the airbag 15 can employ an inflator of even smaller output.

Moreover, the airbag 15 includes means DM for regulating elongating direction of the circumferential wall (the inboard side wall 16*a* and outboard side wall 16*b*) at plastic deformation. Such means DM will help control the shape of the airbag 15 at catching an object of protection (occupant) after full inflation adequately, thereby protecting occupant M securely. In the airbag apparatus 51, specifically, the means DM for regulating elongating direction is comprised of differentiating thicknesses of the circumferential wall (the inboard side wall 16*a* and outboard side wall 16*b*) from part to part, i.e., providing the thin area 16*c* at the upper area of each of the inboard side wall 16*a* and outboard side wall 16*b*. With this configuration, when the inflatable body 16 catches an occupant M after completing inflation, a tensile force acts on an entire area of the inboard side wall 16*a* and outboard side wall 16*b*, so that the thin area 16*c* thinner than the remaining area 16*d* is plastically deformed upward in a elongating fashion as indicated by an area hatched by double-dashed lines in FIG. 8A. Thus the airbag 15 is plastically deformed and enlarges an area of the inflatable body 16, i.e., protection area, while increasing its volume as well, to provide an enlarged area 17 for covering a lateral of the thorax section B of an occupant M, as shown in FIGS. 5, 7, 8A and 8B. Accordingly, the airbag 15 is capable of protecting not only the pelvis section W but also the thorax section B of an occupant M when plastically deformed after completing inflation.

Although the inflator 10 of the foregoing embodiment is inserted into the joint port 18 of the airbag 15 and coupled thereto by the clamp 13, the coupling of the airbag and inflator should not be limited thereby. It will also be appreciated that an inflator is housed inside an airbag such that bolts of the inflator project from the airbag for mounting to a seat frame such that the airbag and inflator are coupled together and the airbag apparatus is mounted on the seat frame.

Figure 10:
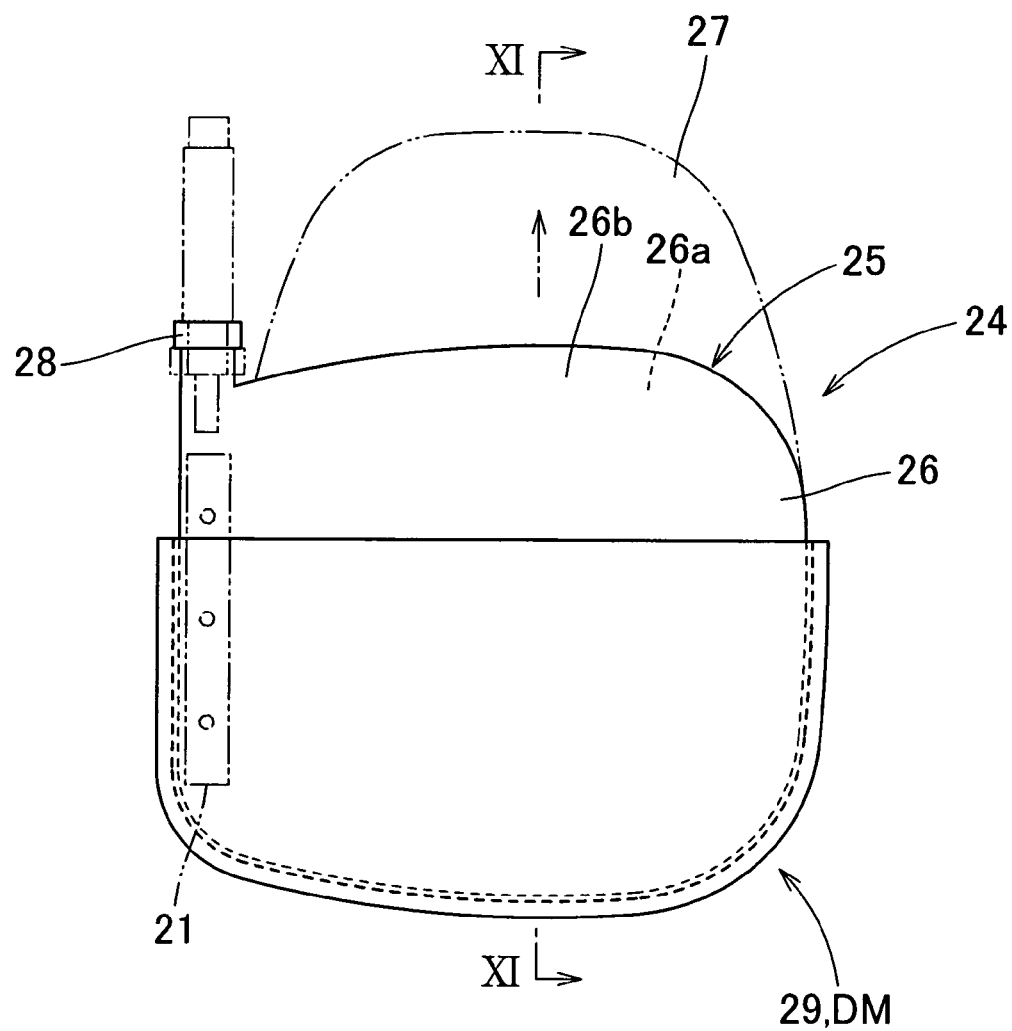
FIG. 10 is a side view of a modification of the airbag.
Figure 11:
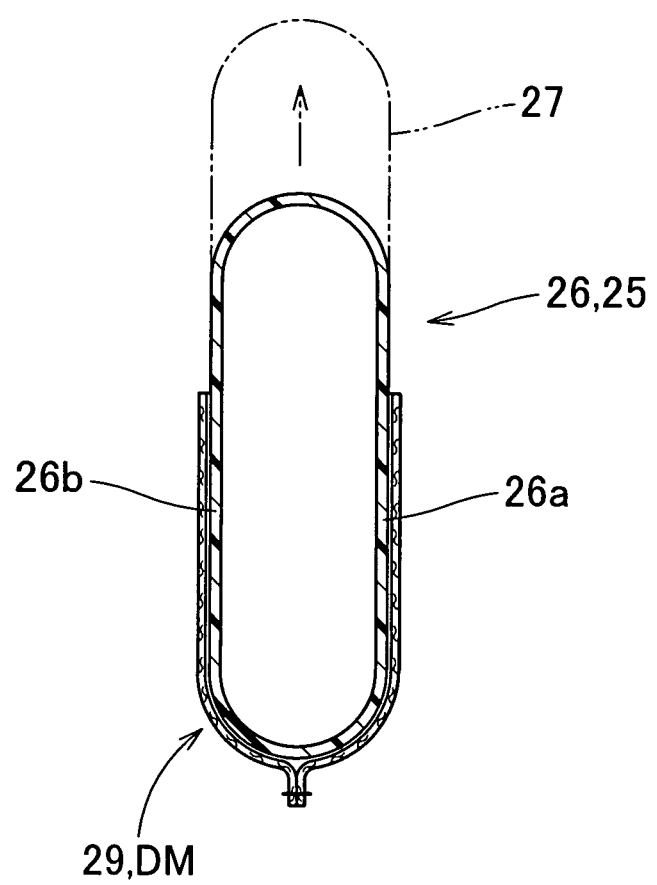
FIG. 11 is a sectional view taken along line XI-XI of FIG. 10.

FIGS. 10 and 11 are illustrative of an airbag 24, a modification of the airbag 15. The airbag 24 includes a main body 25 fabricated of synthetic resin and a covering portion 29 acting as the means DM for regulating elongating direction and covering a generally entire area of the lower half of the inflatable body 26 of the main body 25. The main body 25 is generally identical in outer contour to the airbag 15 of the foregoing embodiment. Except that an inboard side wall 26*a* and an outboard side wall 26*b* forming a circumferential wall of the inflatable body 26 have a generally uniform thickness all over, the main body 25 has a similar structure to the airbag 15. The main body 25 is provided with a joint port 28 alike the airbag 15.

The covering portion 29 acting as the means DM for regulating elongating direction is fabricated of less stretchy material relative to the synthetic resin forming the main body 25 (TPU, in this embodiment) so as to allow upward elongation, while regulating downward elongation, of the inboard side wall 26*a* and outboard side wall 26*b* constituting the circumferential wall of the main body 25. In this specific embodiment, the covering portion 29 is made of woven fabric of polyamide yarn, polyester yarn or the like. The covering portion 29 is generally formed into an open-top bag so as to cover at least part of the lower area (i.e., the area to be regulated) of the outer circumference of the airbag 24 (main body 25), and is so configured as to cover all over the outer circumference of the lower half of the main body 25 at full inflation generally with no gap. The covering portion 29 is secured to a seat frame together with the main body 25 with a mounting bracket 21 for securing the main body 25 to the seat frame, thus the covering portion 29 is coupled to the main body 25. Although not shown in the drawings, when the airbag 24 is folded and housed, the covering portion 29 is folded up (rolled, in this embodiment) together with the main body 25 as mounted around the main body 25 and then housed in a housing.

With this airbag 24, too, the main body 25 of the airbag 24 completes inflation on the outer lateral of an occupant in such a manner as to be restored to the outer contour as molded, with the inboard side wall 26*a* and outboard side wall 26*b* of the inflatable body 26 separated. When the occupant presses the main body 25 of the fully inflated airbag 24, which is supported at the outer face (at the outboard side wall 26*b*) by a door trim located on the outboard side of the occupant, the main body 25 (inflatable body 26) of the airbag 24 is plastically deformed in such a manner that the inboard side wall 26*a* and outboard side wall 26*b* are elongated, thereby enlarging a protection area for covering the lateral of the occupant. At this time, since the covering potion 29 for regulating elongation of the circumferential wall (inboard side wall 26*a* and outboard side wall 26*b*) of the main body 25 covers the lower half of the main body 25 closely, the walls 26*a* and 26*b* are plastically deformed, i.e., elongated, upward at the upper area, which is not covered by the covering portion 29, while prevented from elongating downward as indicated by double-dashed lines in FIGS. 10 and 11. As a result of elongation, the main body 25 enlarges the inflatable body 26 upward and increases its volume, while providing an enlarged area 27. The enlarged area 27 formed by upward enlargement of the inflatable body 26 (protection area) is deployed to cover the thorax section of the occupant, and therefore, the airbag 24 protects the thorax section as well as the pelvis section of the occupant upon plastic deformation after full inflation.

Figure 12:
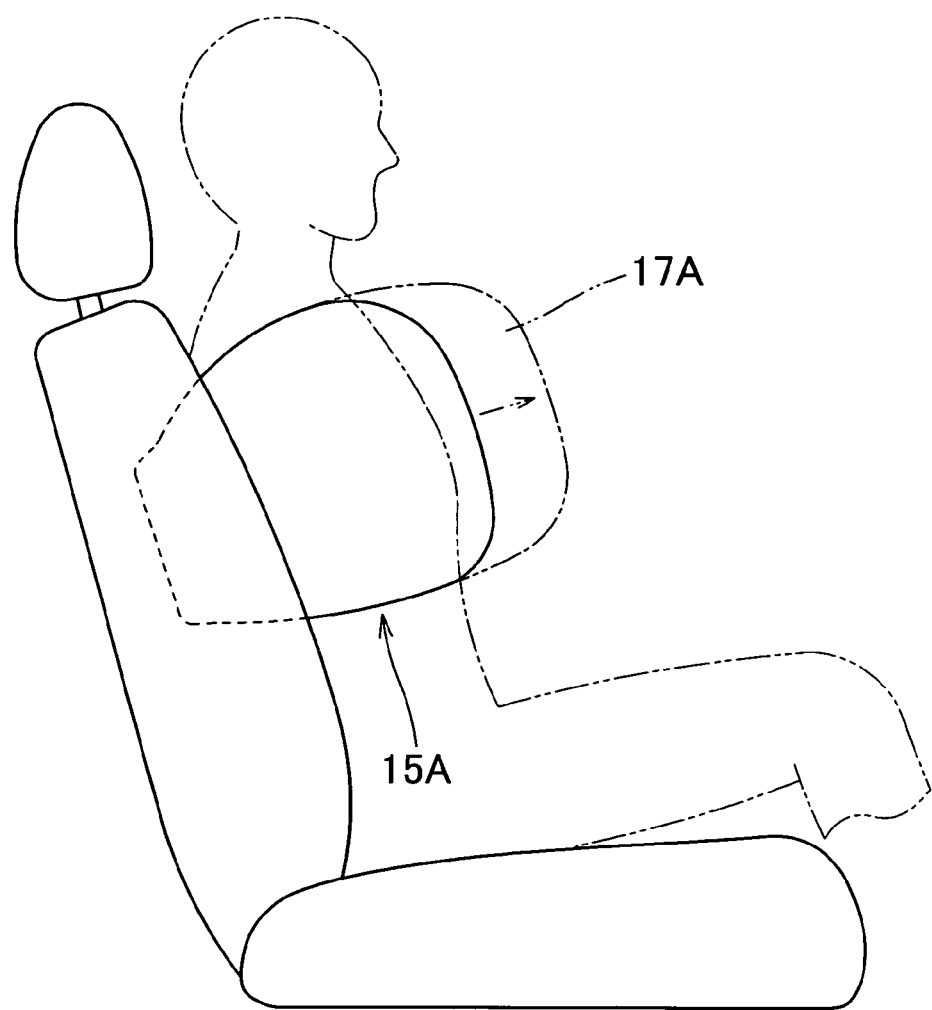
FIG. 12 is a side view of a side impact airbag apparatus employing another modification of the airbag, showing the airbag fully inflated.

The airbag 15/24 of the foregoing embodiments have been described as providing the enlarged area 17/27 on the upper side due to plastic deformation. However, an enlarging direction at plastic deformation, i.e., an elongating direction of the circumferential wall, should not be limited thereby. An airbag, like an airbag 15A shown in FIG. 12, may also be configured to be plastically deformed to provide an enlarged area 17A in front. Furthermore, when the airbag apparatus is used for a side impact, the configuration of the protection area of the airbag should not be limited to those described above, either. By way of example, the airbag may be configured to cover the thorax portion of an occupant before plastic deformation and cover the head of the occupant after plastic deformation. The airbag may also be configured to enlarge in a generally similar shape after plastic deformation relative to the shape before plastic deformation. With the configurations of the foregoing embodiments, the circumferential wall (the inboard side wall 16a/26a and outboard side wall 16b/26b) of the airbag 15/24 are smoothly deformed plastically along the door trim 8 between an occupant M and door trim 8 since the door trim 8, which is formed into a plate, covers the outboard side of the airbag 15/24 at inflation and supports the outboard side of the airbag 15/24 over a wide area.

Figure 13:
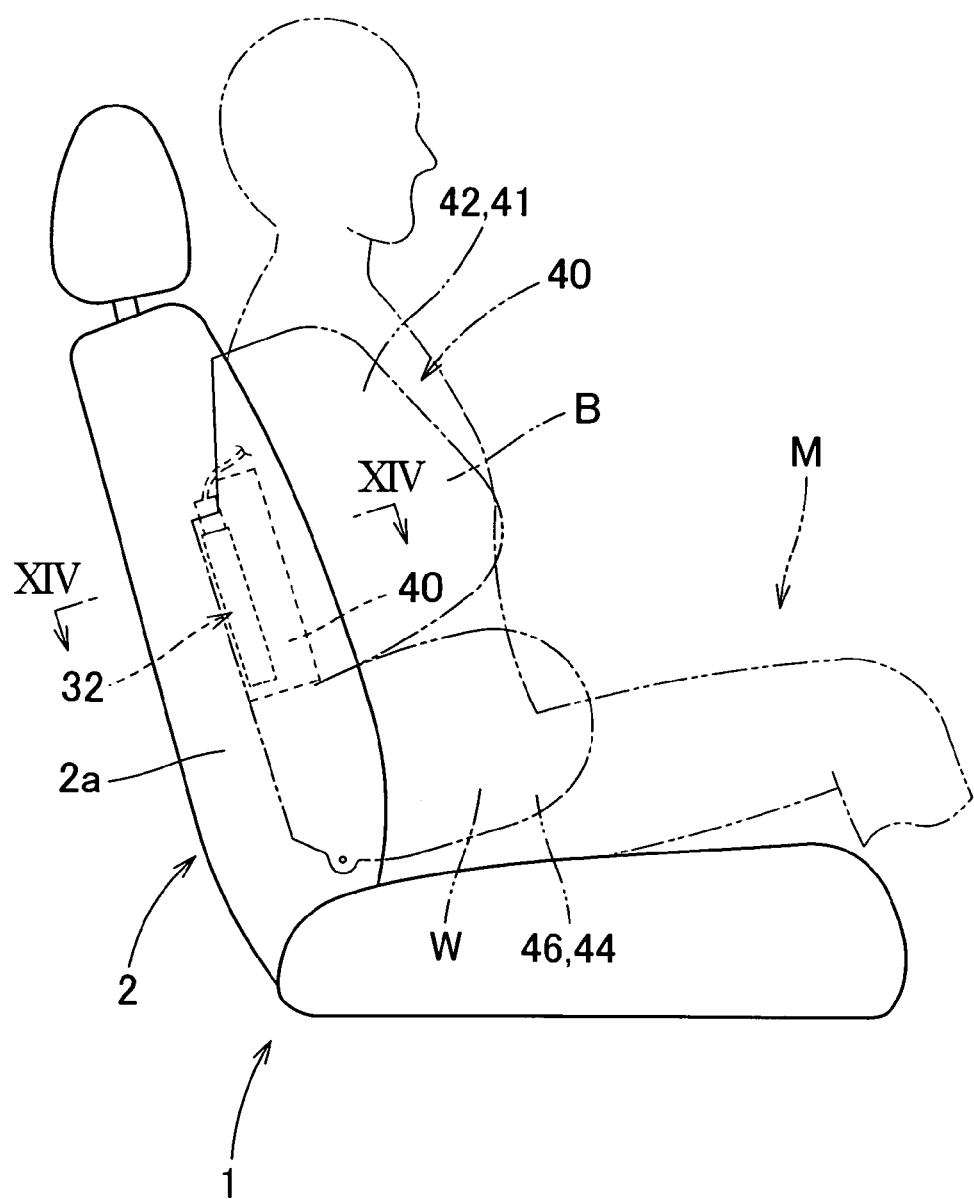
FIG. 13 is a side view of a side impact airbag apparatus according to the second embodiment of the invention as mounted on a seat.
Figure 14:
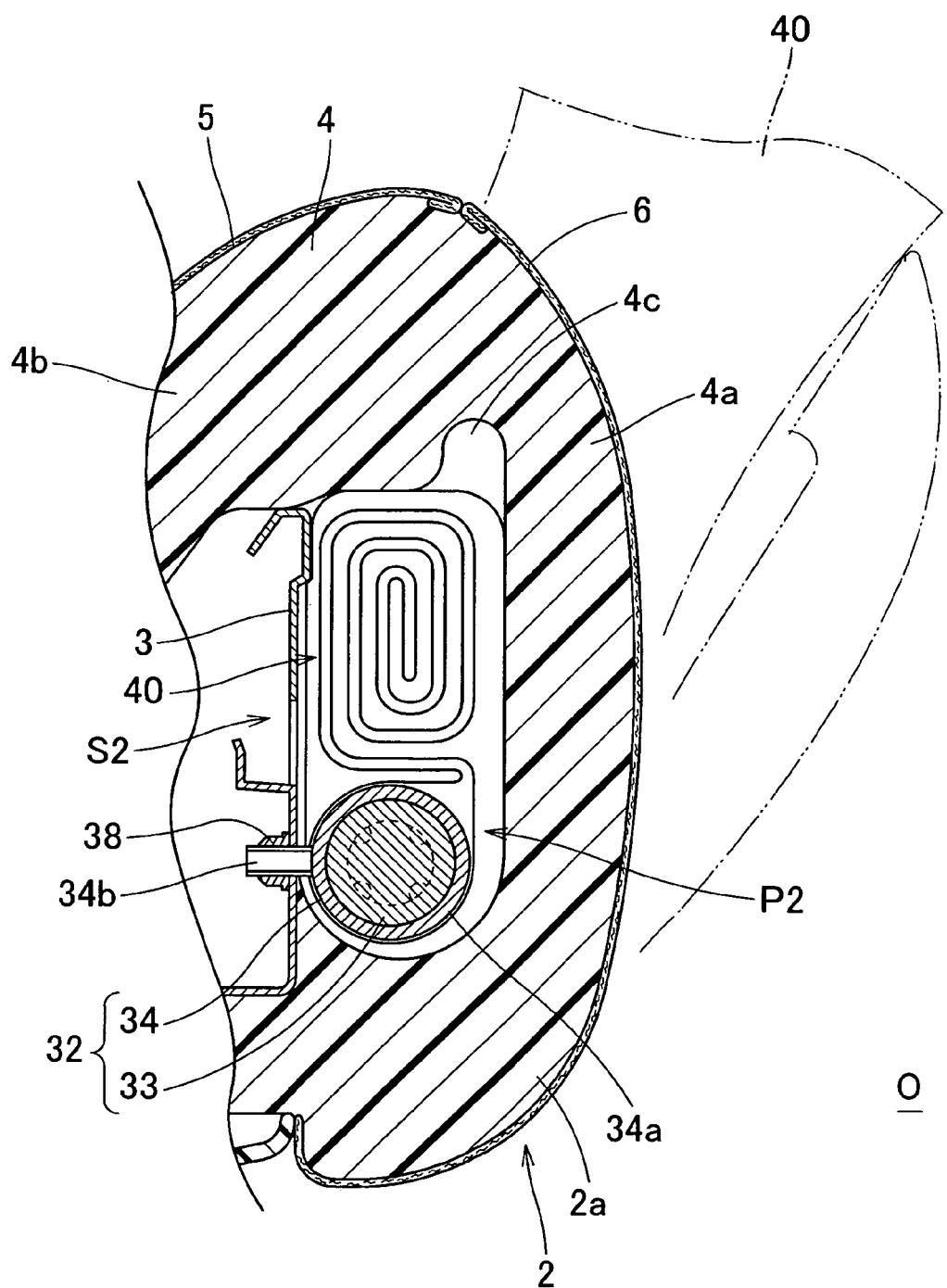
FIG. 14 is a schematic cross section of the airbag apparatus of FIG. 13, taken along line XIV-XIV of FIG. 13.

The second embodiment of the invention is now described. As shown in FIGS. 13 and 14, an airbag apparatus S2, the second embodiment of the invention, is mounted on an outboard (generally indicated at O) lateral (on a right lateral, in the illustrated embodiment) 2a of a back portion 2 of a seat 1 of a vehicle similarly to the first embodiment. The airbag apparatus S2 is housed in a housing area P2 comprised of a void area provided between the cushion 4 and seat frame 3. The airbag apparatus S2 is secured to the seat frame 3 by nut 38 fastening of later-described bolts 34b projecting from a diffuser 34 of an inflator 32.

The airbag apparatus S2 includes an airbag 40, which is folded up, and an inflator 32 for feeding inflation gas to the airbag 40.

Figure 15:
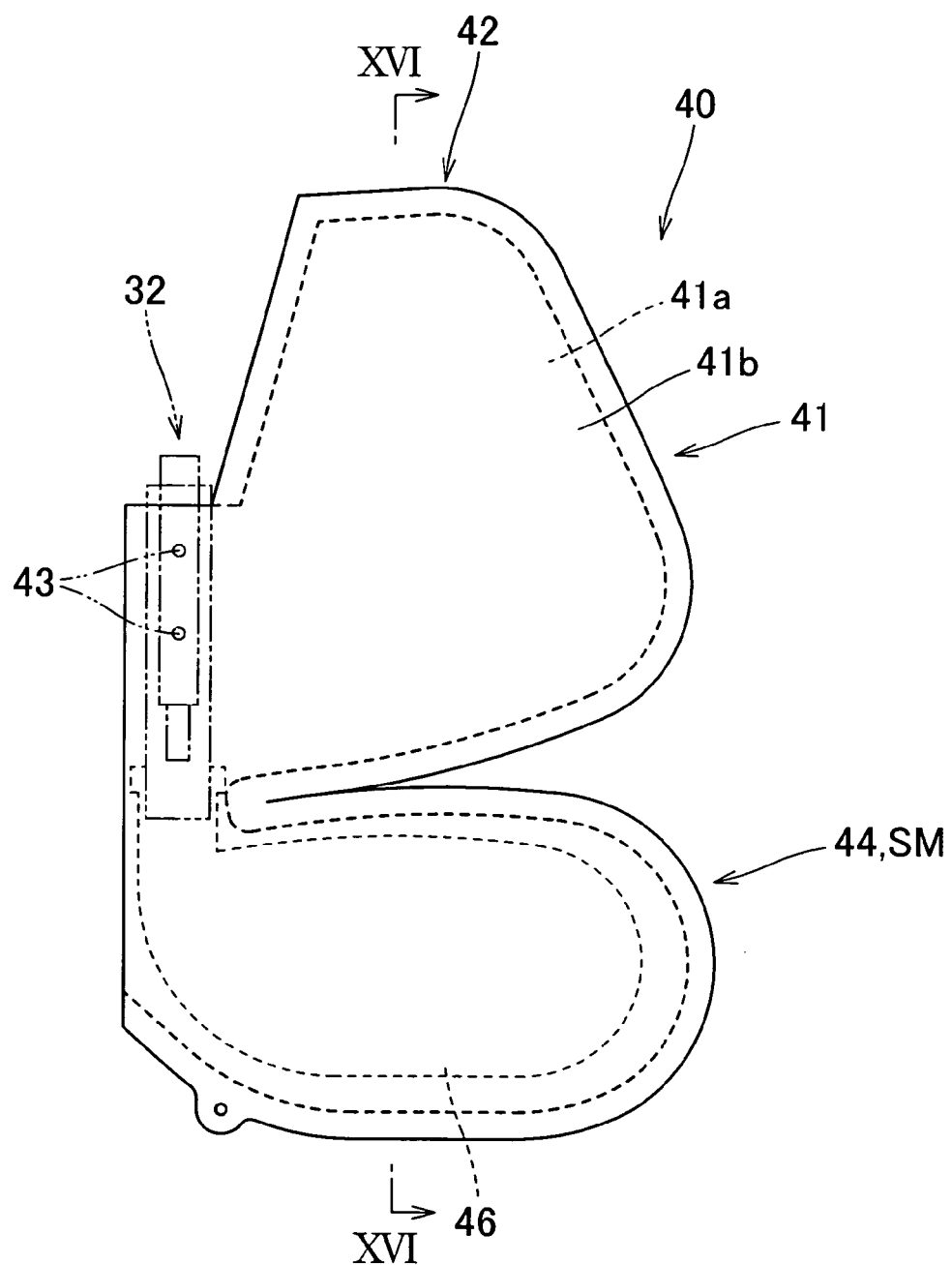
FIG. 15 is a side view of an airbag of the airbag apparatus of the second embodiment.
Figure 16:
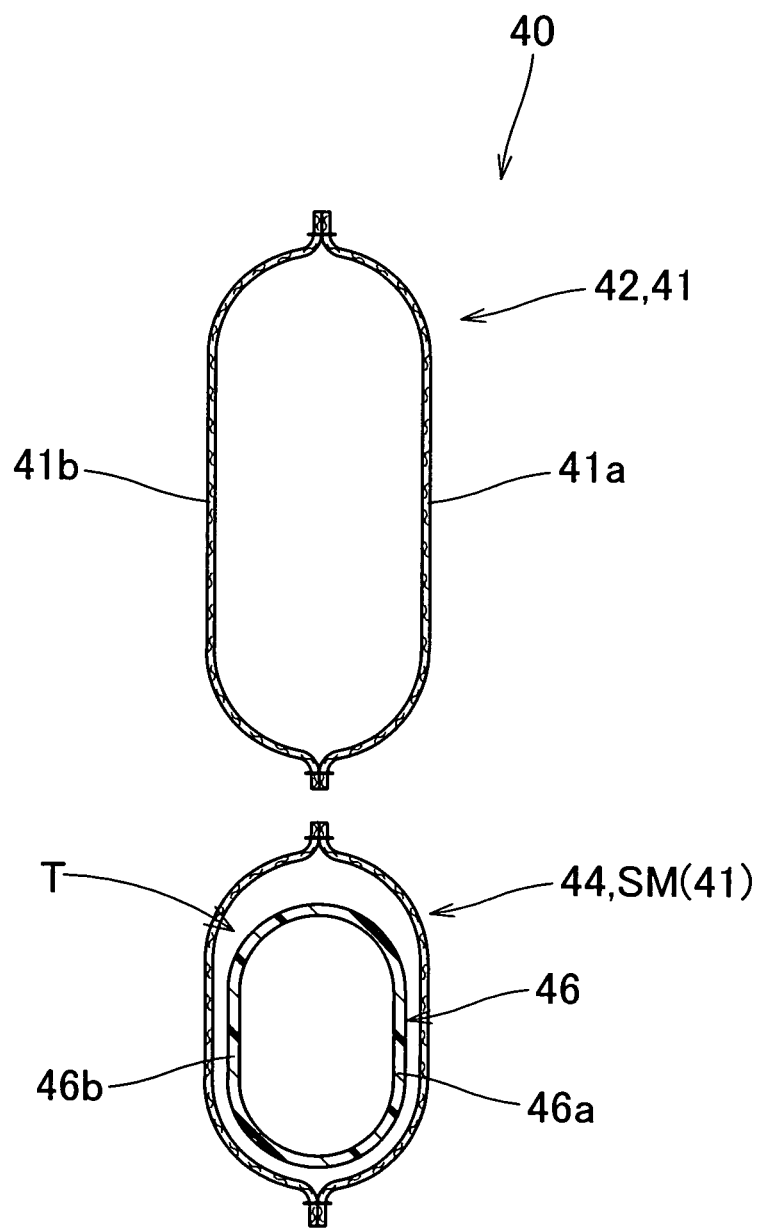
FIG. 16 is a sectional view taken along line XVI-XVI of FIG. 15.
Figure 17:
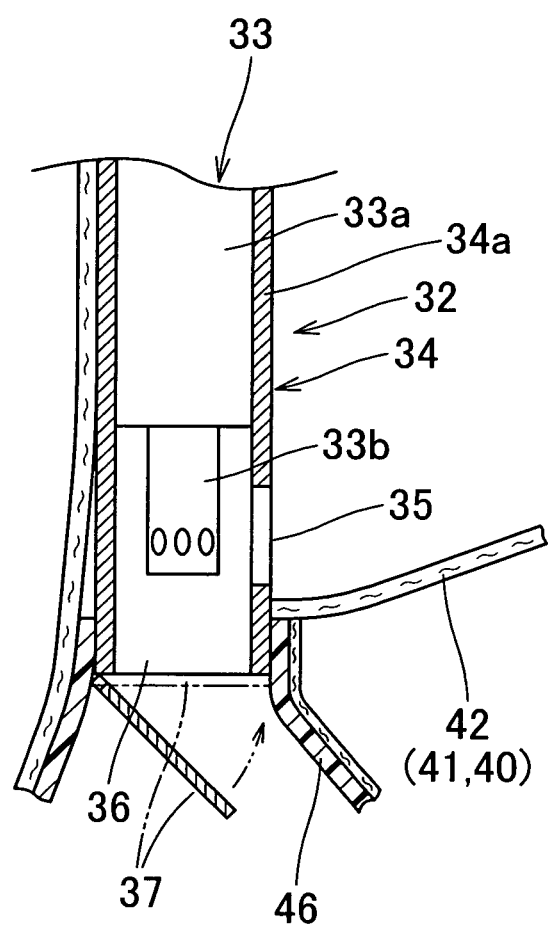
FIG. 17 is a schematic partial enlarged sectional view illustrating the vicinity of gas outlets of an inflator in the second embodiment.

Referring to FIGS. 13, 15, 16 and 17, the inflator 32 includes a generally columnar body 33 and a diffuser 34 mounted around the body 33. In this specific embodiment, the body 33 includes a great diameter portion 33a which is columnar in shape and a small diameter portion 33b located at the bottom of the great diameter portion 33a and provided with gas discharge ports (reference numeral omitted). The diffuser 34 includes a generally tubular holding portion 34a that holds the inflator body 33 and two mounting bolts 34b projecting from the holding portion 34a. The bolts 34b are located one above the other on the holding portion 34a. The inflator 32 is housed inside the airbag 40 with the bolts 34b projecting from later-described mounting holes 43 of the airbag 40. By fastening the bolts 34b projecting from the airbag 40 to the frame 3 of the seat 1 by the nuts 38, the inflator 32 is secured to the seat frame 3 together with the airbag 40 (FIG. 14). As shown in FIG. 17, the diffuser 34 is provided, on the lower region of the holding portion 34a mounted around the small diameter portion 33b (i.e., gas discharge ports), with a gas outlet 35 for feeding inflation gas to a later-described thorax protection region 42 of a covering bag 41 and a gas outlet 36 for feeding the gas to a later-described deformable bag 46 located inside a pelvis protection region 44 of the covering bag 41. The gas outlet 36 for feeding inflation gas to the deformable bag 46 is provided with a check valve 37 for preventing gas having flown into the deformable bag 46 from backing or leaking.

As shown in FIGS. 15 and 16, the airbag 40 includes a covering bag 41 inflatable with inflation gas and made of woven fabric and a deformable bag 46 located inside the covering bag 41 for inflation and fabricated of synthetic resin.

As indicated by double-dashed lines in FIG. 13 and shown in FIG. 15, the covering bag 41 is designed to so inflate as to protect an area of an occupant M seated in the seat 1 from the thorax section B to pelvis section W. The covering bag 41 includes a thorax protection region 42 deployable at a side of the thorax section B of an occupant M and a pelvis protection region 44 deployable at a side of the pelvis section W of the occupant M, respectively at full airbag inflation. The pelvis protection region 44 is located below the thorax protection region 42, and the thorax protection region 42 and pelvis protection region 44 are partitioned from each other. In this specific embodiment, the covering bag 41 is made of woven fabric with polyamide yarn, polyester yarn or the like, and is formed by sewing together outer circumferential edges of an inboard side panel 41a and outboard side panel 41b, which are generally identical in outer contour. The thorax protection region 42 is provided at the rear end with two mounting holes 43 for receiving the mounting bolts 34b of the inflator 32, which holes 43 are arranged one above the other. The pelvis protection region 44 of the covering bag 41 houses the deformable bag 46 and acts as shape regulating means SM that regulates the shape of the deformable bag 46 subjected to plastic deformation. The pelvis protection region 44 is so designed as to cover all the outer circumference of the deformable bag 46 before plastic deformation at full airbag inflation so as to regulate the outer shape of the deformable bag 46 at plastic deformation. Specifically, when the deformable bag 46 is plastically deformed in such a manner that the circumferential wall, i.e., the inboard side wall 46a and outboard side wall 46b, are elongated, the pelvis protection region 44 prevents the walls 46a and 46b of the deformable bag 46 from rupturing or prevents the deformable bag 46 from thinning unduly (prevents the clearance between the walls 46a and 46b from decreasing too much), and thus helps the deformable bag 46 to keep adequate outer contour for catching the pelvis section W of the occupant M. Although FIGS. 16 and 18A shows a void space T between the pelvis protection region 44 and deformable bag 46, inflation gas actually does not flow into the space between the pelvis protection region 44 and deformable bag 46, so that the pelvis protection region 44 itself is not inflatable with inflation gas.

Figure 18:
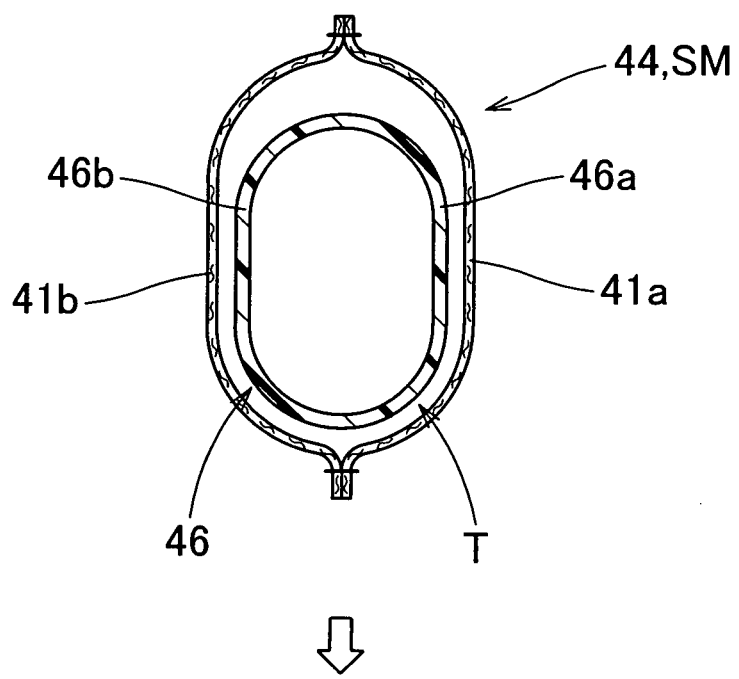
FIG. 18 shows sectional views of a deformable bag of the second embodiment at full inflation and after plastic deformation.
Figure 18:
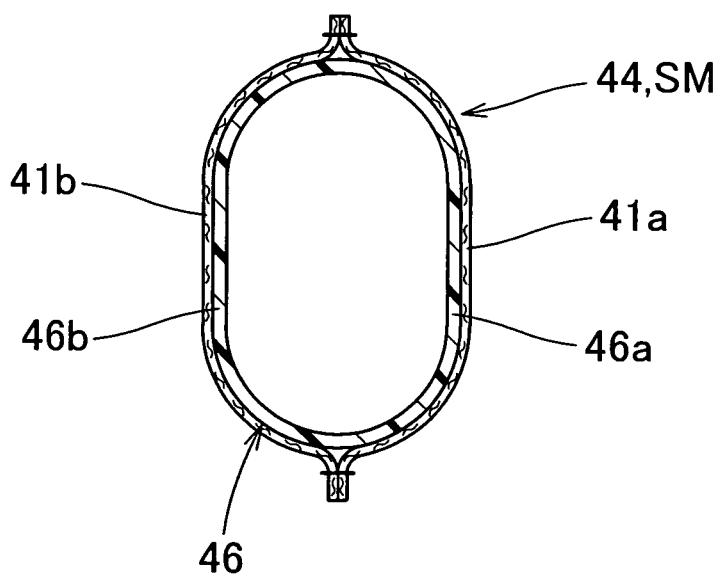

As shown in FIGS. 15 and 16, the deformable bag 46 is installed inside the pelvis protection region 44 of the covering bag 41 and is coupled to the gas outlet 36 of the diffuser 34 of the inflator 32 so as to be inflatable with inflation gas fed from the outlet 36. Similarly to the airbag 15 in the foregoing embodiment, the deformable bag 46 is fabricated of TPU, and is shaped by blow molding into a one-piece bag having the shape at full inflation, i.e., such a shape that the inboard side wall 46a and outboard side wall 46b are separated by the thickness at full inflation. When fed with inflation gas, the deformable bag 46 completes inflation in such a manner as to be restored to the outer contour as molded. Then when catching the pelvis section W of an occupant M, the deformable bag 46 is plastically deformed such that the inboard side wall 46a and outboard side wall 46b are elongated as shown in FIG. 18. The deformable bag 46 is so designed that a slight gap is formed between the deformable bag 46 and pelvis protection region 44 at full inflation. When plastically deformed after full inflation, the deformable bag 46 is enlarged and the entire outer circumference is pressed against the inner circumference of the pelvis protection region 44, and thus the pelvis protection region 44 acting as the shape regulating means SM regulates the outer contour of the deformable bag 46 subjected to plastic deformation.

With the airbag apparatus S2 configured as described above, too, when the inflator 32 is activated, the airbag 40 is deployed between an occupant M and door trim 8 and covers an outboard lateral of the occupant M. After completing inflation, the deformable bag 46 is deformed plastically in such a manner that the inboard side wall 46a and outboard side wall 46b are elongated inside the pelvis protection region 44 when it catches the pelvis section W of an occupant M with the outer face (i.e., the outboard side wall 46b) supported by the door trim 8 via the outboard side panel 41b of the pelvis protection region 44. Accordingly, the deformable bag 46 absorbs the kinetic energy of the occupant M by plastic deformation of the inboard side wall 46a and outboard side wall 46b, and the volume of the deformable bag 46 is increased according to elongation of the walls 46a and 46b, and thus the internal pressure of the deformable bag 46 is suppressed without emitting inflation gas. The deformable bag 46 thus restrains the pelvis section W of the occupant M without applying so much reaction force to the occupant M upon catching the pelvis section W of the occupant M while reducing the kinetic energy of the pelvis section W of the occupant M, thereby protecting the occupant M softly. At this time, the thorax section B of the occupant M is protected by the thorax protection region 42 of the covering bag 41 mounted around the deformable bag 46 since the covering bag 41 is inflated simultaneously with the deformable bag 46.

Therefore, the airbag apparatus S2 is excellent in protecting performance and capable of protecting the occupant M (object of protection) securely as well.

In addition to the advantage described above, the second embodiment includes around the deformable bag 46 the shape regulating means SM (i.e., the pelvis protection region 44) that regulates the outer contour of the deformable bag 46 subjected to plastic deformation. The means SM prevents the circumferential wall (the inboard side wall 46a and outboard side wall 46b) of the deformable bag 46 from thinning too much due to progress of plastic deformation, and thus helps keep the deformable bag 46 in an adequate outer contour for catching the pelvis section W of the occupant M. In this specific embodiment, the deformable bag 46 is so regulated in outer contour as to secure an appropriate thickness for catching the pelvis section W of the occupant M.

Although the deformable bag 46 of the second embodiment is located only in part of the airbag 40, it will also be appreciated to form the whole airbag 40 into double wall structure of a plastically deformable bag of synthetic resin and the shape regulating means mounted there around. Further, although the covering portion 29 forming the means DM for regulating elongating direction and the covering bag 41 forming the shape regulating means SM are formed of a woven fabric less stretchy than TPU, materials for the means for regulating elongating direction and the shape regulating means should not be limited thereby, but any materials less stretchy than the synthetic resin forming the airbag can be used. By way of example, those means may be comprised of a reticular member formed of less stretchy material relative to the synthetic resin forming the airbag.

Further, although each of the airbag 15/24 and deformable bag 46 of the airbag 40 in the foregoing embodiments has been described as shaped by blow molding into a one-piece bag having the shape at full inflation, configuration of the airbag 15/24 and deformable bag 46 should not be limited thereby. It will also be appreciated to form an airbag of the invention by coupling two panels of synthetic resin together at peripheral edges such that the airbag is inflated while the circumferential wall thereof comprised of the two panels are elongated. It is desired in this case as well that the airbag completes inflation at or under a tensile stress at yield point of the synthetic resin forming the circumferential wall (inboard side and outboard side panels) of the airbag. In terms of ample allowance for deformation (plastic deformation) upon catching an occupant, however, the configuration of the foregoing embodiments, that the airbag is shaped by blow molding into a one-piece bag having the shape at full inflation so as to be restored to the outer contour as molded, will be more preferable.

Although the foregoing embodiments of the invention have been described as applied to a side impact airbag apparatus mountable at a lateral of a seat, the application of the invention should not be limited thereby. Since the invention relates to an airbag apparatus with an airbag that is plastically deformable when an internal pressure rises due to arresting an object of protection (occupant), the invention may also be applied to such a type of airbag apparatus that includes an airbag deployable in a narrow gap between an occupant and vehicle body structure and is supported by the vehicle body structure at full inflation. For example, the invention will be preferable for use in such airbag apparatuses as a knee-protecting airbag apparatus, head-protecting airbag apparatus, rear-impact airbag for protecting a head of a rear-seat occupant from the rear.

What is claimed is:

1. An airbag apparatus adapted to be mounted on a vehicle as housed in a housing, the apparatus comprising an airbag inflatable with inflation gas for catching an object of protection, the airbag comprising a sheet-shaped circumferential wall made from thermoplastic synthetic resin, wherein the circumferential wall is plastically deformable in such a manner as to be elongated due to increase of internal pressure caused by being pressed by the object of protection when arresting the object of protection after full inflation, and wherein the airbag is configured to complete inflation at or under a tensile stress at yield point of the thermoplastic synthetic resin that forms the circumferential wall of the airbag.

2. The airbag apparatus as set forth in claim 1, further comprising around the airbag means for regulating an outer contour of the airbag after plastic deformation.

3. The airbag apparatus as set forth in claim 1, wherein:
the airbag is adapted to be mounted, in a folded-up state, on a seat in which an occupant as the object of protection is seated, so as to deploy at a side of the occupant; and
the airbag is plastically deformable when catching the occupant in such a manner as to enlarge an area thereof for covering a lateral portion of the occupant with an outer face thereof supported by a vehicle body structure.

4. The airbag apparatus as set forth in claim 1, wherein the thermoplastic synthetic resin has a tensile strength of about 40 to about 60 MPa according to JIS K 7311, a tensile stress at proportional limit of 0.5 MPa and above according to JIS K 7113, a tensile stress at yield of 1 MPa and above according to JIS K 7113, a breaking elongation of 450% above according to JIS K 7161 and a thickness of the circumferential wall is thinner than other walls of the airbag.

5. The airbag apparatus as set forth in claim 1, wherein a surface area of the airbag after full inflation is larger than before full inflation.

6. The airbag apparatus as set forth in claim 1, wherein the airbag comprises means for regulating elongating direction of the circumferential wall at plastic deformation.

7. The airbag apparatus as set forth in claim 6, wherein the means for regulating elongating direction is comprised of a covering portion that covers at least part of an outer circumference of the airbag on a direction to be regulated.

8. The airbag apparatus as set forth in claim 6, wherein the means for regulating elongating direction is comprised of differentiating thicknesses of the circumferential wall from part to part.

9. An airbag apparatus adapted to be mounted on a vehicle as housed in a housing, the apparatus comprising an airbag inflatable with inflation gas for catching an object of protection, the airbag comprising a sheet-shaped circumferential wall made from thermoplastic synthetic resin, wherein
the circumferential wall is plastically deformable in such a manner as to be elongated due to increase of internal pressure caused by being pressed by the object of protection when arresting the object of projection after full inflation and, the airbag has no vent mechanisms for exhausting inflation gas.

10. An airbag apparatus mounted in a vehicle, the apparatus comprising an airbag inflatable with inflation gas for catching an object of protection, the airbag having a circumferential wall that is arranged adjacent the object of protection, the circumferential wall being an outside wall of the bag and being made from sheet-shaped material, wherein during full inflation of the airbag, the circumferential wall is configured to plastically deform and permanently enlarge by increasing internal pressure within the airbag that is generated by inflation gas and by the object of protection pressing against the airbag, and wherein the airbag is configured to complete inflation at or under a tensile stress at yield point and below a tensile stress at rupture of a synthetic resin that forms the circumferential wall of the airbag.

11. The airbag apparatus as set forth in claim 10, wherein the airbag has no vent mechanisms for exhausting inflation gas.

12. The airbag apparatus as set forth in claim 10, further comprising means for regulating an outer contour of the airbag after plastic deformation.

13. The airbag apparatus as set forth in claim 10, wherein:
the airbag is adapted to be mounted, in a folded-up state, on a seat in which an occupant as the object of protection is seated, so as to deploy at a side of the occupant; and the airbag is plastically deformable when catching the occupant and enlarges a catching area for covering a lateral portion of the occupant, and area of the airbag is supported by a vehicle body structure.

14. The airbag apparatus as set forth in claim 10, wherein the circumferential wall of the airbag is made from a thermoplastic material having a tensile strength of about 40 to about 60 MPa according to JIS K 7311, a tensile stress at proportional limit of 0.5 MPa and above according to JIS K 7113, a tensile stress at yield of 1 MPa and above according to JIS K 7113, a breaking elongation of 450% above according to JIS K 7161 and a thickness of the circumferential wall is thinner than other walls of the airbag.

15. The airbag apparatus as set forth in claim 10, wherein a surface area of the airbag after full inflation is larger than before full inflation.

16. The airbag apparatus as set forth in claim 10, wherein the airbag comprises means for regulating an elongating direction of the circumferential wall during plastic deformation.

17. The airbag apparatus as set forth in claim 16, wherein the means for regulating an elongating direction comprises a covering portion that covers at least part of an outer circumference of the airbag in the elongating direction.

18. The airbag apparatus as set forth in claim 16, wherein the means for regulating elongating direction is comprised of differentiating thicknesses between the circumferential wall and other wall portions of the airbag.

* * * * *